J. W. FREEMAN.
AUTO-DRIVE BOAT.
APPLICATION FILED OCT. 6, 1908. RENEWED NOV. 20, 1909.
956,491.
Patented Apr. 26, 1910.
3 SHEETS—SHEET 1.
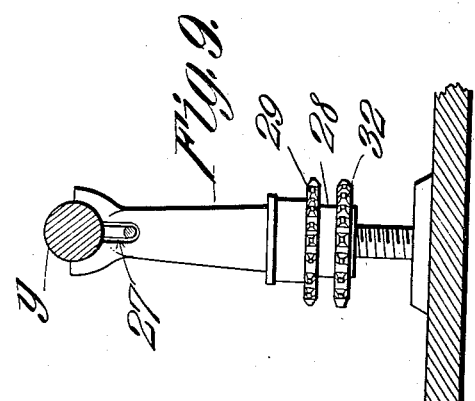
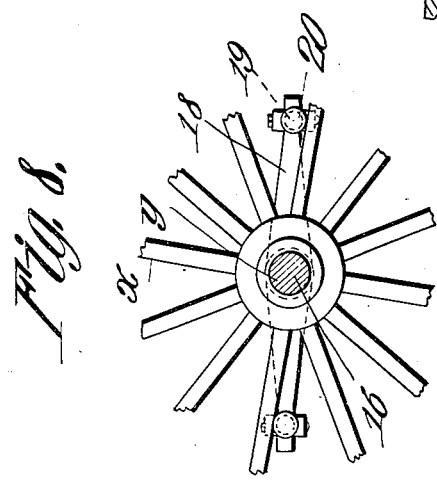
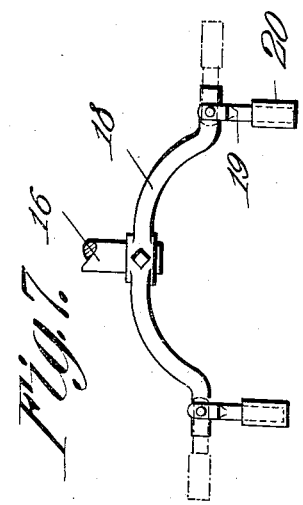
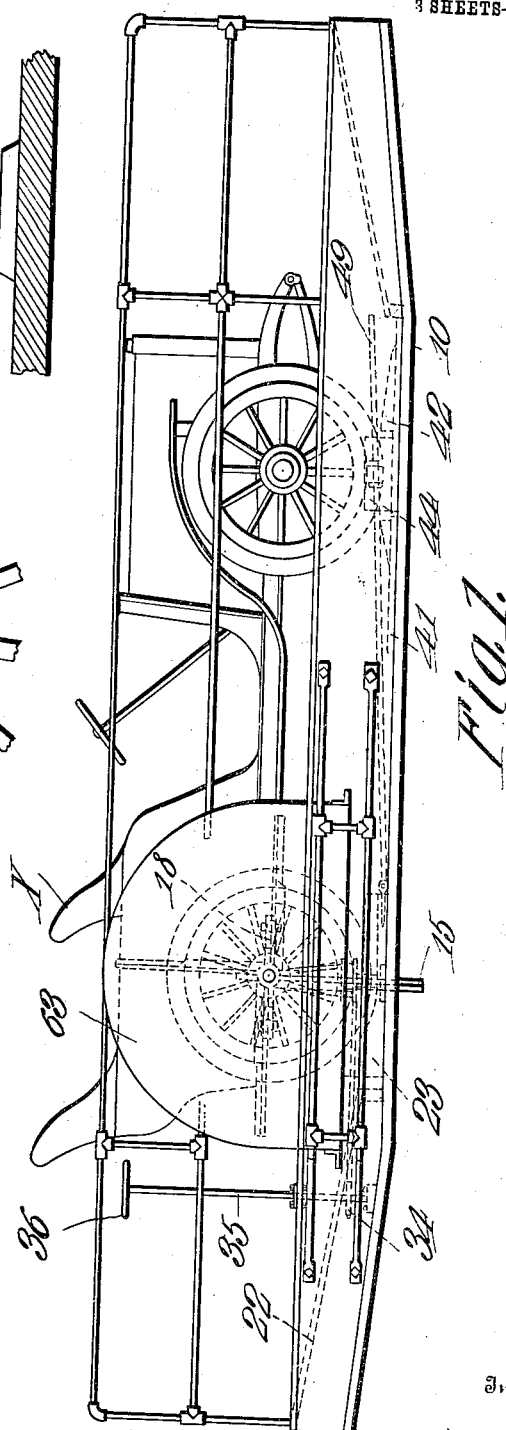
Inventor
John W. Freeman

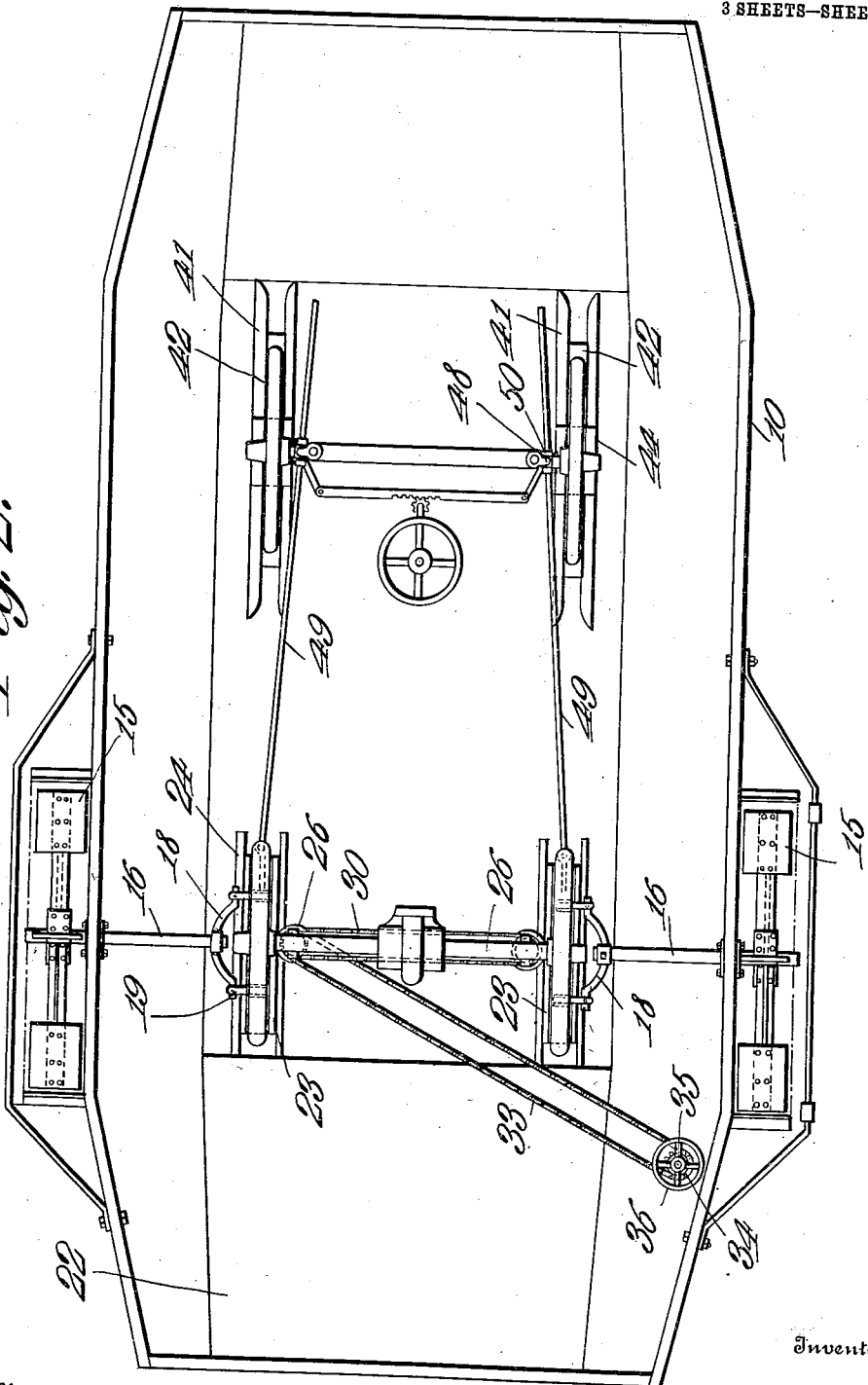

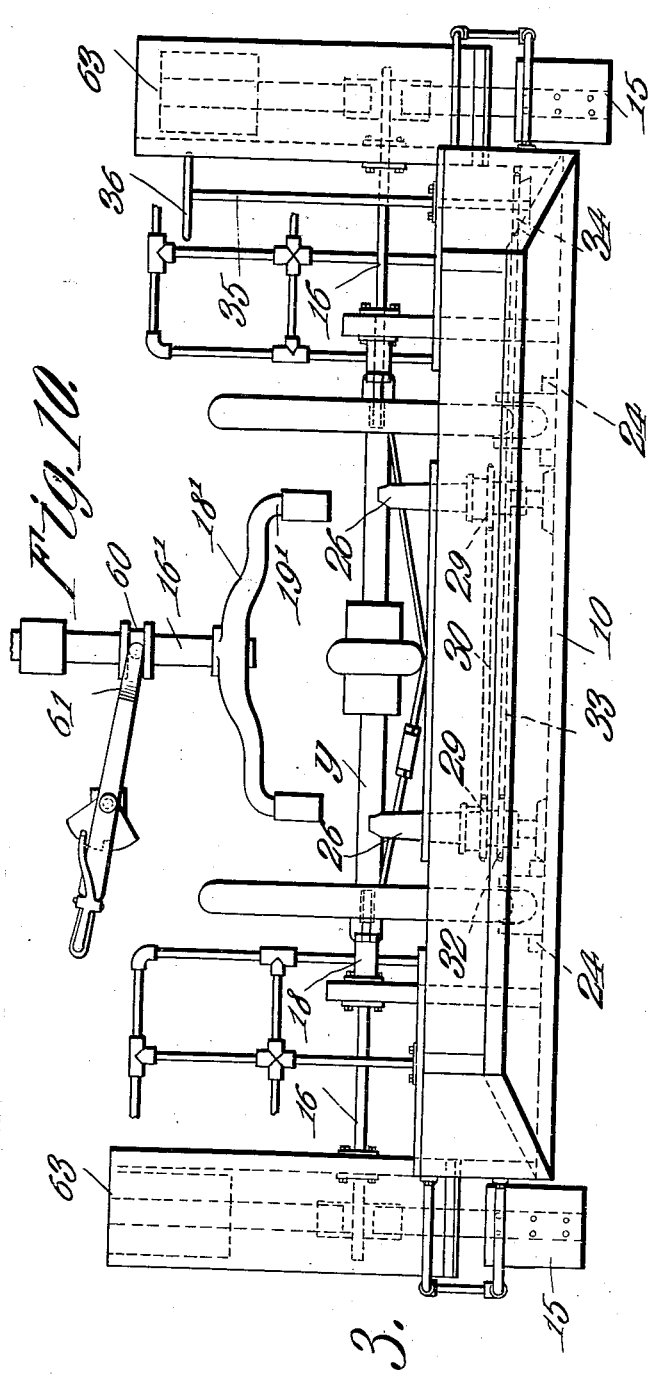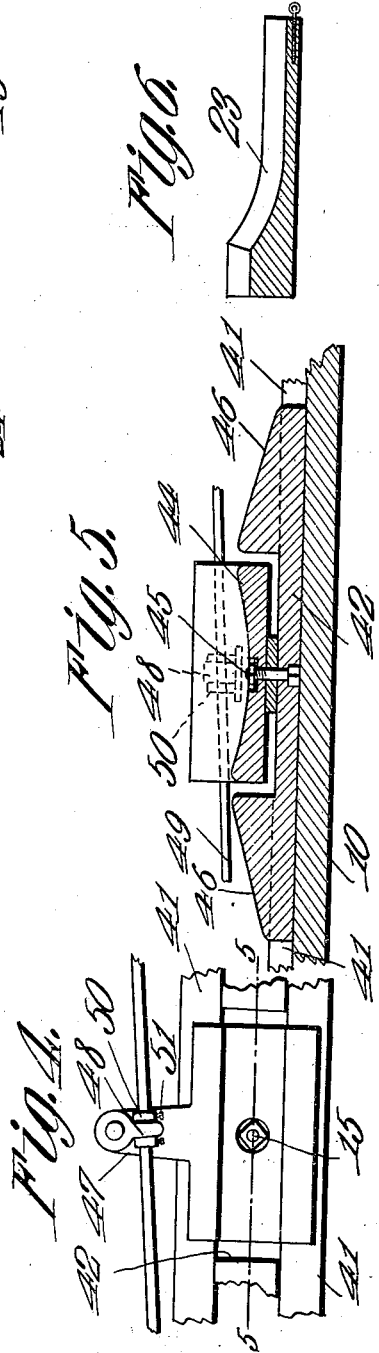

UNITED STATES PATENT OFFICE.

JOHN W. FREEMAN, OF JOPLIN, MISSOURI.

AUTO-DRIVE BOAT.

956,491.  Specification of Letters Patent.  Patented Apr. 26, 1910.

Application filed October 6, 1908, Serial No. 456,359.  Renewed November 20, 1909.  Serial No. 529,096.

*To all whom it may concern:*

Be it known that I, JOHN W. FREEMAN, a citizen of the United States, residing at Joplin, in the county of Jasper and State of Missouri, have invented a new and useful Auto-Drive Boat, of which the following is a specification.

The principal object of the present invention is to provide means whereby an automobile of any construction may be employed for the purpose of driving a boat.

A further object of the invention is to so construct and arrange the boat that the automobile may be run into position thereon and the power of the automobile employed for the purpose of propelling the boat while the driver or chauffeur still seated in the automobile may change the speed, stop, start and steer in just the same manner as he would in driving the automobile on the road.

A still further object of the invention is to provide a structure of this kind in which the driving wheels of the automobile may be readily connected to and disconnected from the propelling wheels, screw, or other device used in the propulsion of the vessel.

A still further object of the invention is to provide a boat structure so arranged as to permit convenient adjustment for the reception of all types of automobiles of whatever length of wheel base.

A still further object of the invention is to provide a novel means for connecting the automobile driving wheels to the paddle of the boat.

A still further object of the invention is to provide a steering means of such nature that the rotation of either of the automobile driving wheels may be frictionally retarded or wholly stopped while the other continues to operate, so that the paddle wheel or other boat propelling devices may be utilized in directing the course of the vessel.

With these and other objects in view, as will more fully hereinafter appear, the invention consists in certain novel features of construction and arrangement of parts, hereinafter fully described, illustrated in the accompanying drawings, and particularly pointed out in the appended claims, it being understood that various changes in the form, proportions, size and minor details of the structure may be made without departing from the spirit or sacrificing any of the advantages of the invention.

In the accompanying drawings:—Figure 1 is a side elevation of an auto-drive boat constructed in accordance with the invention. Fig. 2 is a plan view of the same. Fig. 3 is a rear elevation, partly in section and drawn upon a somewhat larger scale. Fig. 4 is a plan view of one of the pivoted shoes arranged for the reception of the front or steering wheels. Fig. 5 is a longitudinal sectional view of the same on the line 5—5 of Fig. 4. Fig. 6 is a detail view of one of the brake shoes employed to retard or stop the rotative movement of the driving wheels of the automobile. Fig. 7 is a plan view showing a preferred construction of connecting means between the automobile driving wheel and the boat propelling wheel. Fig. 8 is a vertical section showing the manner in which the connecting means engages the spokes of the driving wheel. Fig. 9 is an elevation, partly in section, of one of the lifting jacks employed to raise the rear or driving wheels from contact with the bottom of the boat. Fig. 10 is a modification of the connection between the automobile driving wheels and propeller shaft.

Similar characters of reference are employed to indicate corresponding parts throughout the several figures of the drawings.

The boat 10 may be of any ordinary construction, but in the present instance is shown as of the flat bottom type, slightly tapering at both bow and stern. It is within the scope of the invention to employ a rudder or similar steering device, but in the present instance the boat propelling devices, shown as side paddle wheels, are independently controllable, so that either of them may be slowed down or stopped in order to guide the course of the boat.

The automobile X may be of any ordinary construction, and in practice is run directly on to the boat and connected up to the boat propelling devices and is then manipulated in the same manner as it would be on land, the chauffeur remaining in his seat and proceeding in the ordinary manner to drive ahead, to reverse, change speed, and steer. For convenience the boat is preferably provided with suitable side rails, and at bow and stern has guard chains which may be unhooked or released when the automobile is passing onto or from the boat.

While the boat may be provided with propelling devices of any construction, these have been shown in the present instance in the form of side paddle wheels 15, but it is to be understood that these are merely typ-
ical, and a stern paddle wheel, screw propellers, oars, or any other type of boat pro-
pelling device may be employed. The pro-
pellers 15 are mounted on independent shafts 16 that are disposed in axial aline-
ment, their adjacent ends being spaced
apart a distance sufficient to permit of the passage of the automobile X. Near the in-
ner end of each shaft 16 is adjustably se-
cured a pair of arms 18 which are provided at their outer ends with pivoted fingers 19 of the construction best shown in Figs. 7 and 8, and these fingers may be turned from the inoperative position indicated by dotted lines in Fig. 7 to the operative position shown in full lines. In this latter position the fingers pass between the spokes $x$ of the rear driving wheels of the automobile, and said fingers are preferably provided with coverings 20 of rubber or other yieldable material in order to prevent scratching or other mutilation of the driving wheels. It will be seen that when the fingers 20 are thus engaged with the driving wheels the rotative movement of the latter will be im-
parted to the paddle wheels for the purpose
of driving the boat ahead or astern.

The stern of the boat is provided with an inclined flooring 22 down which the auto-
mobile is run until the rear wheels pass over and rest within a pair of grooved brake blocks 23 of the construction best shown in Fig. 6. Each block is provided with a groove approximately semi-circular in cross section in order to frictionally engage with an extensive area of the tire surface when necessary. The blocks are so mounted as to slide in the direction of their lengths, being guided between parallel pairs of bars 24 that run fore and aft of the vessel.

After the automobile is run on to the boat and the rear wheels rest on the blocks 23, the rear or driving shaft $y$ of the automobile is in vertical alinement with the axes of the two shafts 16, but is in a plane somewhat be-
low said shafts. The axle $y$ now rests directly above a pair of screw jacks 26 of the construction best shown in Fig. 9, these jacks having shaft receiving sockets at their upper ends and being further provided with re-
cesses 27 for the free passage of the axle
struts. The nuts 28 of the jacks are pro-
vided with sprocket wheels 29 that are con-
nected by a link belt 30 and the nut of the port jack is provided with an additional sprocket wheel 32 that is connected by a link belt 33 to a sprocket wheel 34. The sprocket wheel 34 is carried by a vertical shaft 35 mounted in bearings at the starboard side of the boat and out of the path of travel of the automobile. The upper end of this shaft has a hand wheel 36 which may be turned for the purpose of manipulating the jacks and thus raising or lowering the rear of the automobile. The rear axle is raised out of engagement with the brake blocks and is brought into a position in axial alinement with the propeller shafts 16, after which the fingers 20 are turned to spoke engaging po-
sition.

Near the bow of the boat are two pairs of parallel fore and aft guides 41 arranged for the reception of blocks 42, there being one of such blocks at each side and directly in the path of the front or steering wheels of the automobile. These blocks may be read-
ily shifted toward and from the brake blocks 23 in order to accommodate automo-
biles having different lengths of wheel base. The blocks 42 are provided with central re-
cesses arranged for the reception of wheel supporting shoes 44 that are concaved longitudinally on an arc corresponding approxi-
mately to the radius of the front wheels and these shoes are approximately U-shaped in cross section so as to engage against the op-
posite sides of the tire and felly. The shoes 44 are pivotally connected to the blocks 42 by pivot pins or bolts 45, and in order to permit the passage of the front wheels on to and from the shoes, the end portions of the blocks are provided with inclined planes 46 as shown more clearly in Fig. 5.

Extending from the inner face of each steering shoe 44 is an arm 47 carrying a finger 48 that is provided with an opening for the reception of a rod 49, the rear end of which is pivotally connected to one of the brake blocks 23. Arranged on the rod is a pair of collars 50 which may be locked in po-
sition on either side of the finger 48 by means of set screws 51. This construction permits of such adjustment of the block 42 and shoe 44 as may be necessary to accommodate auto-
mobiles having different lengths of wheel base, it being merely necessary to release the set screws 51 so that the block and the shoe may be slid backward or forward as re-
quired.

The front or steering wheels of the auto-
mobile rest in the shoes 44 and as the latter are pivoted to the blocks 42 said shoes will be turned when the steering wheels are turned, and the operator seated in the auto-
mobile may manipulate his steering wheel in the ordinary manner as on land and turn the front wheels and the shoes 44. This movement of the shoes is transmitted through the rods 49 to the brake blocks 23 of the rear wheel and one of said blocks is moved into engagement with one of the rear driving wheels, while the other block moves away from the mating wheel. The steering blocks may be turned in such manner as to exercise any degree of braking pressure on the driving wheels and the latter will be retarded or may be stopped. In either case the paddle wheel to which said driving wheel is connected will run slower than the other paddle wheel, and the latter will, therefore, turn the boat to the right or left as the case may be. It is obvious, of course, that instead of using the rods 49 as tension members to draw the brake blocks against the wheels they may be used as thrust rods to force braking devices of any type against the wheels and thus accomplish the same result.

The mechanism employed for connecting the driving wheels to the paddle wheels may be varied in a number of ways, as, for instance, by providing the arms 18′ with integral fingers 19′ disposed parallel with the propeller shaft 16′. The propeller shaft may then be mounted in its bearing in such manner as to permit the longitudinal movement necessary to engage and disengage the fingers and the spokes of the driving wheel. For this purpose the shaft may be provided with a grooved collar 60 arranged to receive the bifurcated end of an operating lever 61 somewhat after the manner of a clutch lever.

In order to avoid splashing of water on the boat or automobile the paddle wheels are preferably provided with boxings or casings 63 of any desired construction.

What is claimed is:—

1. A boat arranged to receive an automobile, a pair of independently operable propelling devices, independent connections between the driving wheels of the automobile and the propelling devices, and means for independently controlling the speed of rotation of the driving wheels.

2. A boat arranged to receive an automobile, a pair of independently operable propelling devices arranged one at each side of the boat, independent connections between the driving wheels of the automobile and the propelling devices, and a braking means for independently controlling the speed of rotation of the driving wheels.

3. A boat arranged to receive an automobile, a pair of independently operable propelling devices disposed one at each side of the boat, independent connections between the driving wheels of the automobile and the propelling devices, and means operable from the steering mechanism of the automobile for controlling the speed of operation of the propelling devices independent of each other.

4. A boat arranged to receive an automobile, independently operable controlling devices disposed one at each side of the boat, independent connections between the driving wheels of the automobile and the propelling devices, friction blocks controlling the speed of operation of the propelling devices, and means whereby the friction blocks may be connected to the steering mechanism of the automobile.

5. A boat arranged to receive an automobile, independently operable propelling devices arranged one at each side of the boat, detachable connections between the driving wheels of the automobile and the propelling devices, brake blocks arranged to engage said driving wheels, and brake block operating devices operable from the steering mechanism of the automobile.

6. A boat arranged to receive an automobile, independently operable propelling devices disposed one at each side of the boat, detachable connections between the driving wheels of the automobile and the propelling devices, brake blocks arranged to engage said driving wheels, steering shoes arranged to receive the front or steering wheels of the automobile, and connections between the steering device and the brake blocks.

7. A boat arranged to receive an automobile, propelling devices arranged one at each side of the boat, means for connecting the driving wheels of the automobile to the propelling devices, steering shoes arranged to receive the front or steering wheels of the automobile, adjustable supports for said shoes, arms extending from said shoes, brake blocks arranged to engage the driving wheels, rods extending from the brake block to said arms, and means for adjustably connecting the rods and arms.

8. A boat arranged to receive an automobile, propelling devices at the opposite sides of the boat, shafts carrying the propelling devices, arms adjustably mounted on the shafts, and pivoted fingers carried by the arms and movable into engagement with the spokes of the automobile driving wheels.

9. A boat arranged to receive an automobile, propelling devices arranged at the opposite sides of the boat, shafts carrying the propelling devices, arms adjustably mounted on the shafts, and fingers pivoted to said arms and movable into the spaces between the spokes of the automobile driving wheels, said fingers being provided with yieldable coverings.

10. A boat arranged to receive an automobile, boat propelling devices arranged for connection with the driving wheels of the automobile, parallel guides disposed in the bow of the boat, blocks mounted in said guides and adjustable to accommodate automobiles having different lengths of wheel base, steering shoes pivotally mounted on the blocks, and grooved to receive the front or steering wheels of the automobile, and means operable by said shoes for independently controlling the speed of operation of the driving wheels.

11. A boat arranged to receive an automobile, independently operable propelling devices arranged one at each side of the boat, a plurality of spaced jacks arranged to receive the rear portion of the automobile, and means for simultaneously operating said jacks and thereby raising the automobile until its driving wheels are clear of the floor or deck of the boat.

12. A boat arranged to receive an automobile, propelling devices arranged one at each side of the boat, shafts carrying said propelling devices, a pair of jacks arranged in vertical alinement with the axes of said shafts and provided with sockets for the reception of the driving axle of the automobile, and means disposed at one side of the boat and connected to both jacks whereby the latter may be simultaneously operated to raise the driving shaft into axial alinement with the shafts of the propelling devices.

13. A boat arranged to receive an automobile, a pair of independently operable boat-propelling devices, arranged for independent and direct connection with the driving wheels of the automobile, and in axial alinement therewith.

14. A boat arranged to receive an automobile, a propelling device on the boat, means for directly connecting the driving wheels of the automobile to the propelling device in axial alinement, and means for supporting the automobile with the driving wheels clear of the floor or deck of the boat.

15. A boat arranged to receive an automobile, propellers at the sides of the boat, shafts carrying said propellers, and means for directly connecting the shafts to the driving wheels of the automobile in axial alinement.

In testimony that I claim the foregoing as my own, I have hereto affixed my signature in the presence of two witnesses.

JOHN W. FREEMAN.

Witnesses:
C. E. DOYLE,
JAS. M. WALKER.